UNITED STATES PATENT OFFICE.

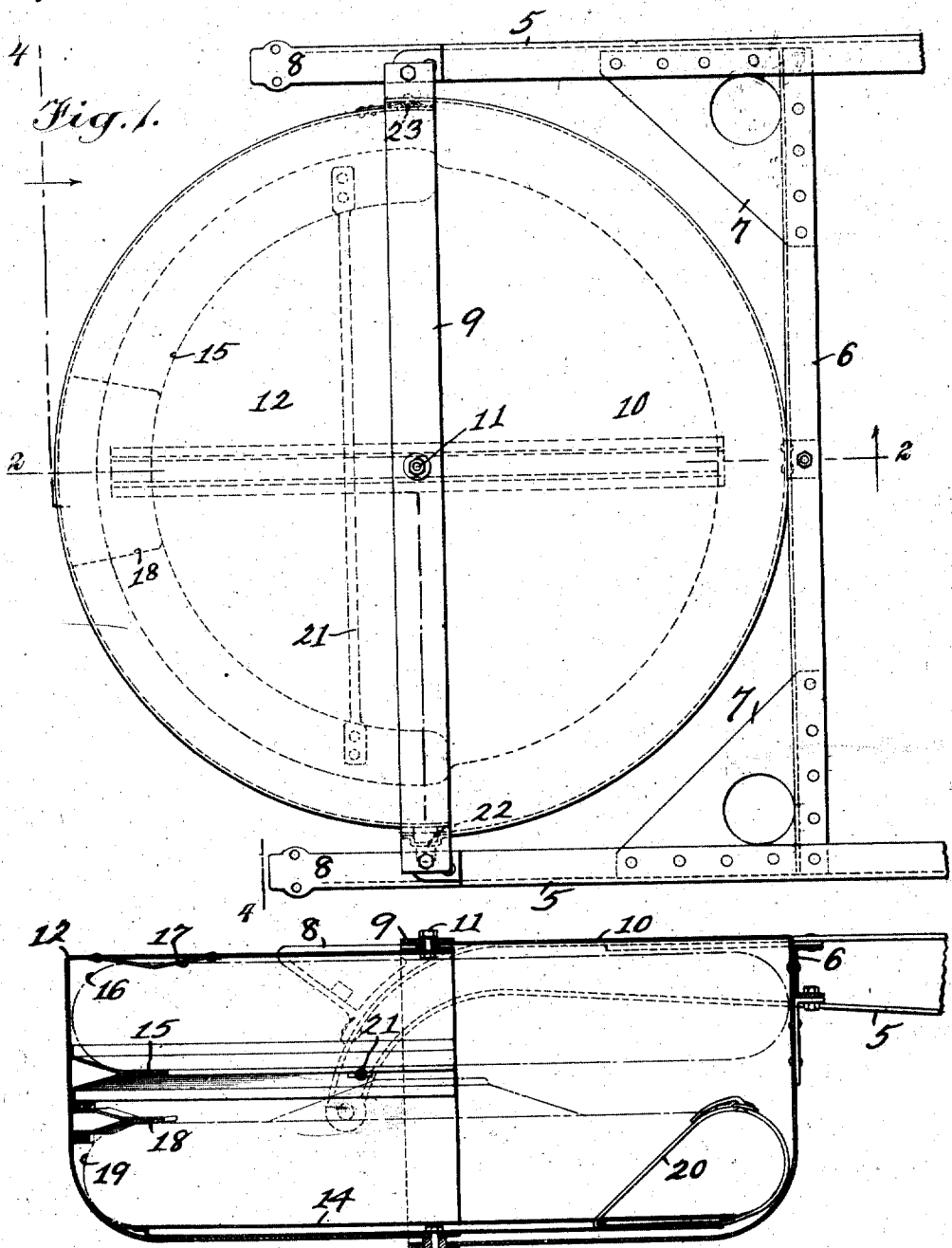

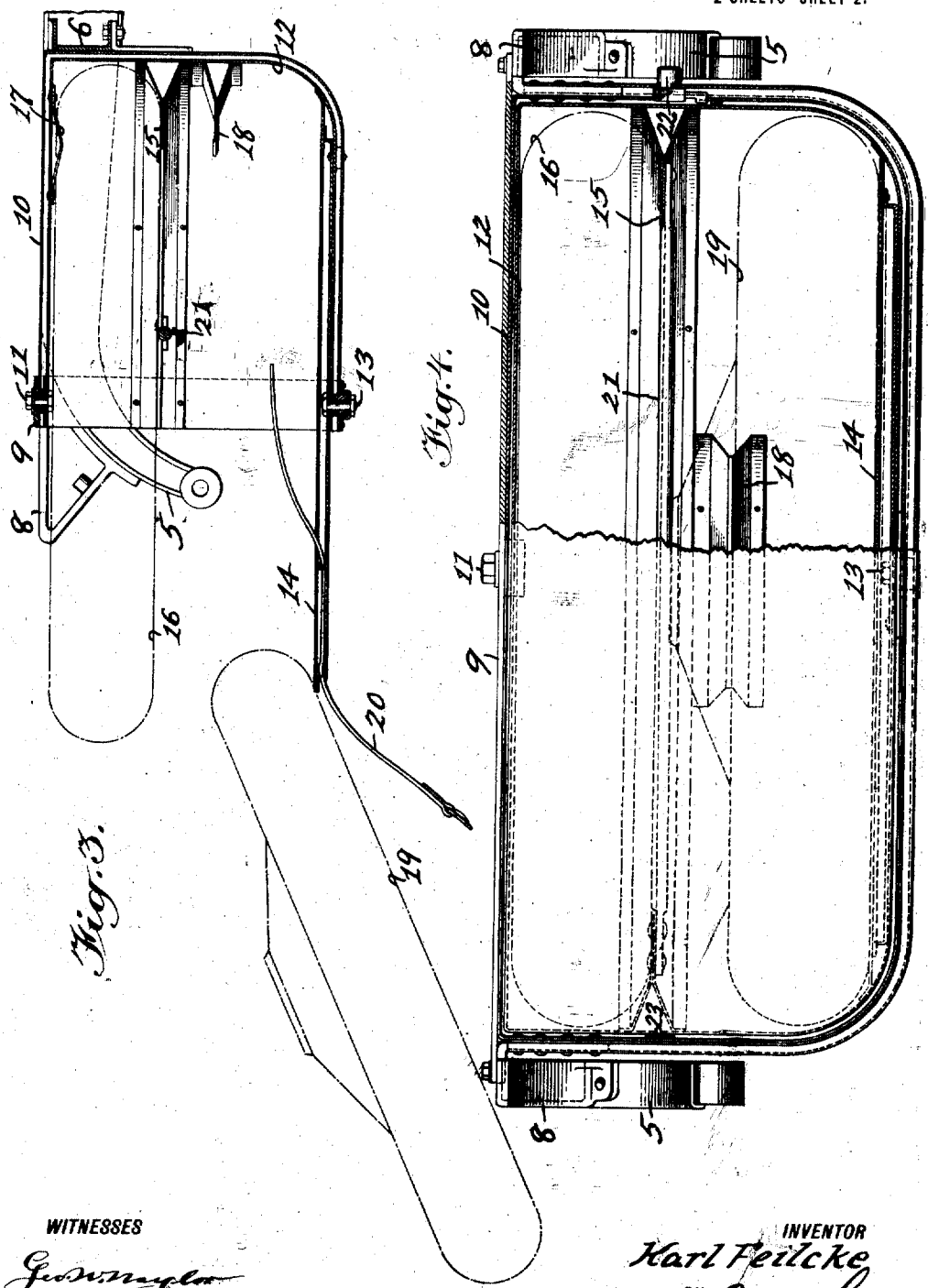

KARL FEILCKE, OF INDIANAPOLIS, INDIANA.

SPARE-TIRE CARRIER.

1,234,646.  Specification of Letters Patent.  Patented July 24, 1917.

Application filed May 31, 1916. Serial No. 100,774.

*To all whom it may concern:*

Be it known that I, KARL FEILCKE, a subject of the Emperor of Germany, and a resident of Indianapolis, in the county of Marion and State of Indiana, have invented certain new and useful Improvements in Spare-Tire Carriers, of which the following is a specification.

My invention relates to carriers for spare tires or spare wheels on automobiles, and the main object thereof is to provide means which overcome the faults when the spare tires or wheels are carried on the running board at one side of the automobile, such as unbalancing the car, obstructing entrance to the car, etc., and also the faults of the present method of rear carriers, such as obstructing the tail lamp and license plate, compelling the rear end of the body to terminate abruptly, thus marring the design of the body, difficulty in mounting the tires or wheels on the car or in removing the same therefrom, liability to damage to the relatively frail brackets, etc., at the rear of the car, and practically impossible prevention of theft of the tires.

Attempts have been made to overcome these faults by the provision of tire compartments in the body but these compartments required enormous doors, weakened the body, and prevented the use of the tail end of the car for storage of suit-cases, or other articles.

By means of my method the spare tires are carried in a casing suspended from the chassis of the automobile beneath the body whereby the tires may be protected against theft, dirt, rain, etc., whereby no great physical effort is needed to store or to remove the tires, whereby the rattling of the tires so common now is overcome, whereby tire covers are dispensed with, whereby there is no liability of damage to the frail brackets, etc., at the rear of the car, which overcomes the necessity for the straps used at present, and which does not interfere in the slightest degree with the body design.

My invention is fully described in the following specification, of which the accompanying drawings form a part, in which like characters refer to like parts in each of the views, and in which:—

Figure 1 is a top plan view of my invention in closed condition and showing its relative position with respect to the side bars of the chassis;

Fig. 2 is a section taken on the line 2—2 of Fig. 1;

Fig. 3 is a view similar to Fig. 2 but showing the carrier open, a spare tire therein, and a spare wheel partly removed therefrom; and Fig. 4 is a rear view thereof, partly broken away, as on the line 4—4 of Fig. 1.

Referring to the drawings, 5 represents the rear ends of the side bars of an automobile joined, in the present embodiment of my invention, by a transverse channel bar 6 which is braced by plates 7, Fig. 1, and I provide brackets 8 at the dip in said side bars joined by a bar 9 arranged above the center of the carrier and serving as a support therefor.

Bolted or otherwise secured to the transverse bar 6 is a segmental casing 10 also suspended from the bar 9 by means of a pivot bolt 11 passed therethrough and through a supplemental segmental casing 12 of less diameter than the casing 10 and projected partly thereinto, whereby the casing 12 may be swung inwardly of the casing 10 on the pivot 11 and upon a supplemental pivot 13 in the lower part of said casings, to present the open side of the casing 12 to the rear of the automobile.

The casing 12 is provided with a substantially circular floor plate 14 extending within the casing 10 when the carrier is closed and projecting well to the rear of the same when open, and said casing 12 is also provided with a segmental horizontal partition plate 15 for the upper spare tire 16 indicated by dotted lines, with a spring tire retainer 17 above the tire 16, with a spring retainer 18 for the spare wheel 19 indicated by dotted lines, with a securing strap 20 for the spare wheel, and with a rod 21 connecting the inner ends of the segmental partition plate 15.

When the carrier is open, as shown in Fig. 3, it is easy and simple to enter the spare tire and spare wheel into their respective positions and the strap 20 secured to the latter, after which the casing 12 with the contained tire and wheel is swung on its pivots into the position shown in Figs. 1 and 2, thereby entirely concealing and protecting the said tire and wheel against theft, injury, or soiling, and, as shown at 22, Fig. 4, I provide a lock, preferably a Yale, to lock the casings in closed positions. In order to insure the proper relative positions of the casings to insure lock operation I may provide a detent indicated by dotted lines at 23, Fig. 1, but this and other details are subject to modification to meet tastes and conditions.

My carrier occupies the position of the gasolene tank in some makes of automobile, and will usually be within the tonneau or rear deck so as not to increase the length of the automobile and so as to prevent injury thereto. Aside from the above features, the visibility of the rear license plate and rear lamp is not affected by my carrier, nor is the balance of the automobile, and in view of the fact that only plain surfaces are presented it is much easier to clean the car.

As will be understood, I reserve the right to make such changes in and modifications of the specific form shown and described, provided such changes come within the spirit of the invention and the scope of the appended claims.

Having fully described my invention, what I claim as new, and desire to secure by Letters Patent, is:—

1. A spare tire or wheel carrier, comprising a segmental casing adapted to be secured to the chassis of an automobile, and a second segmental casing pivoted to the first casing to swing into the same and provided in its lower portion with a member projecting beyond its open side and with means for securing a tire or wheel therein.

2. A spare tire carrier for an automobile, comprising two segmental casings in pivotal connection and rotatable one within the other, said inner casing having a substantially circular floor extended into said outer casing when said carrier is closed and extended beyond said carrier when the latter is open, and means for securing said carrier to an automobile.

KARL FEILCKE.